(12) United States Patent
Shimada et al.

(10) Patent No.: US 9,466,426 B2
(45) Date of Patent: Oct. 11, 2016

(54) LAMINATED CERAMIC CAPACITOR (71) Applicant: MURATA MANUFACTURING CO., LTD., Nagaokakyo-shi, Kyoto-fu (JP)

(72) Inventors: Kohei Shimada, Nagaokakyo (JP); Hiroyuki Wada, Nagaokakyo (JP); Keisuke Araki, Nagaokakyo (JP); Hiroyuki Yoshioka, Nagaokakyo (JP); Masato Ishibashi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/777,679

(22) Filed: Feb. 26, 2013

(65) Prior Publication Data

US 2013/0163144 A1    Jun. 27, 2013

Related U.S. Application Data

(63) Continuation of application No. PCT/JP2012/052861, filed on Feb. 8, 2012.

(30) Foreign Application Priority Data

Feb. 23, 2011    (JP) .................. 2011-037398

(51) Int. Cl.
*H01G 4/06*    (2006.01)
*C04B 35/00*    (2006.01)
(Continued)

(52) U.S. Cl.
CPC ............... *H01G 4/12* (2013.01); *B32B 18/00* (2013.01); *C04B 35/4682* (2013.01); *C04B 35/62685* (2013.01); *H01G 4/005* (2013.01); *H01G 4/1227* (2013.01); *H01G 4/30* (2013.01); *C04B 2235/3206* (2013.01); *C04B 2235/3208* (2013.01); *C04B 2235/3213* (2013.01); *C04B 2235/3215* (2013.01);
(Continued)

(58) Field of Classification Search
CPC .... H01G 4/30; H01G 4/1227; H01G 4/0085; H01L 28/55; C04B 35/46; C04B 35/4682
USPC .................. 361/321.1, 321.2, 321.5; 501/134
See application file for complete search history.

(56) References Cited

U.S. PATENT DOCUMENTS 6,563,690 B2 *   5/2003   Kishi et al. .................. 361/312
2003/0199385 A1  10/2003  Kamiya et al.
(Continued)

FOREIGN PATENT DOCUMENTS

CN    1445800 A    10/2003
CN    1525503 A     9/2004
(Continued)

*Primary Examiner* — Eric Thomas
*Assistant Examiner* — Arun Ramaswamy
(74) *Attorney, Agent, or Firm* — Arent Fox LLP (57) ABSTRACT

Provided is a laminated ceramic capacitor which can suppress degradation of the insulation resistance due to the addition of vanadium. Second insulating layers are stacked on both sides in the stacking direction of a first insulating layer group, which has first insulating layers stacked over one another, and internal electrodes are placed on principal surfaces of the first insulating layers. At least one internal electrode is placed between the first and second insulating layers. Both contain, as their main constituent, a perovskite-type compound represented by the formula "$ABO_3$" wherein "A" denotes at least one of Ba, Sr, and Ca, "B" denotes at least one of Ti, Zr, and Hf. V is added to only the first insulating layers.

20 Claims, 4 Drawing Sheets

(51) Int. Cl.
  *H01G 4/12*    (2006.01)
  *H01G 4/005*   (2006.01)
  *H01G 4/30*    (2006.01)
  *B32B 18/00*   (2006.01)
  *C04B 35/468*  (2006.01)
  *C04B 35/626*  (2006.01)

(52) U.S. Cl.
  CPC .......... *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3239* (2013.01); *C04B 2235/3241* (2013.01); *C04B 2235/3244* (2013.01); *C04B 2235/3256* (2013.01); *C04B 2235/3258* (2013.01); *C04B 2235/3262* (2013.01); *C04B 2235/3272* (2013.01); *C04B 2235/3275* (2013.01); *C04B 2235/3279* (2013.01); *C04B 2235/3418* (2013.01); *C04B 2235/442* (2013.01); *C04B 2235/5409* (2013.01); *C04B 2235/5445* (2013.01); *C04B 2235/6025* (2013.01); *C04B 2235/6584* (2013.01); *C04B 2235/79* (2013.01); *C04B 2237/346* (2013.01); *C04B 2237/588* (2013.01)

(56) References Cited

U.S. PATENT DOCUMENTS

| | | |
|---|---|---|
| 2004/0233612 A1 | 11/2004 | Sugimoto et al. |
| 2006/0128553 A1 | 6/2006 | Yanagida et al. |
| 2008/0030921 A1* | 2/2008 | Kaneda et al. ............... 361/272 |
| 2009/0201628 A1 | 8/2009 | Kagata et al. |
| 2009/0207554 A1* | 8/2009 | Iguchi ..................... H01G 2/24 361/321.2 |

FOREIGN PATENT DOCUMENTS

| | | |
|---|---|---|
| CN | 1983478 A | 6/2007 |
| JP | 03209806 A | 9/1991 |
| JP | 2000243648 A | 9/2000 |
| JP | 2000311828 A | 11/2000 |
| JP | 2008239402 A | 10/2008 |
| JP | 2009212261 A | 9/2009 |
| WO | WO-2008126351 A1 | 10/2008 |

* cited by examiner

LAMINATED CERAMIC CAPACITOR

This is a continuation of application Serial No. PCT/JP2012/052861, filed Feb. 8, 2012, the entire contents of which are incorporated herein by reference.

TECHNICAL FIELD

The present invention relates to a laminated ceramic capacitor, and more particularly, to a laminated ceramic capacitor which has a dielectric ceramic layer containing, as its main constituent, a perovskite-type compound such as barium titanate ($BaTiO_3$).

BACKGROUND ART

Conventionally, barium titanate ($BaTiO_3$)-based compounds have been preferably used for the dielectric ceramic layers of laminated ceramic capacitors, and various accessory constituents are added to the compounds in order to achieve various types of characteristics (dielectric constant, temperature characteristics of dielectric constant, insulation resistance (IR), lifetime characteristics in a loading test, etc.). For example, Patent Document 1 discloses the addition of V (vanadium). The addition of vanadium is effective for electrical characteristics, and the addition of an appropriate amount of vanadium allows a wider range of item design.

PRIOR ART DOCUMENT

Patent Document 1: Japanese Patent Application Laid-Open No. 2000-311828

SUMMARY OF THE INVENTION

Problem to be Solved by the Invention

Laminated ceramic capacitors have been manufactured by stacking and firing ceramic green sheets. During the firing, the temperatures of the inner layers (sections sandwiched by internal electrodes for forming electrostatic capacitance) are increased later than the temperatures of the outer layers (the outermost layers which serve as protective layers). The addition of vanadium makes the ceramics likely to be sintered, thus increasing the difference in sintered state between the outer layers and the inner layers. Therefore, spheroidizing (the phenomenon of partially forming a spherical shape) may be caused in the internal electrodes near the boundaries between the outer layers and the inner layers, thereby leading to locally defective insulation resistance, and decreasing the reliability of the laminated ceramic capacitors.

The present invention is, in view of these circumstances, intended to provide a laminated ceramic capacitor which can suppress degradation of the insulation resistance due to the addition of vanadium.

Means for Solving the Problem

In order to solve the problem, the present invention provides a laminated ceramic capacitor configured as follows.

The laminated ceramic capacitor includes: (a) a plurality of first insulating layers stacked over one another; (b) internal electrodes placed on principal surfaces of the first insulating layers; and (c) second insulating layers stacked respectively on both sides in the stacking direction of a first insulating layer group which includes the first insulating layers stacked over one another. At least one of the internal electrodes is placed between the first insulating layer and the second insulating layer. The first and second insulating layers contain, as their main constituent, a perovskite-type compound represented by the chemical formula "$ABO_3$" wherein "A" denotes at least one of Ba (barium), Sr (strontium), and Ca (calcium), "B" denotes at least one of Ti (titanium), Zr (zirconium), and Hf (hafnium), and "O" denotes oxygen. V (vanadium) is added only to the first insulating layers. No V is added to the second insulating layers. An amount of 0.01 parts by mole or less of V with respect to 100 parts by mole of the B constituent in the ceramic component of the second insulating layers, is herein regarded as "no V added".

In the configuration described above, the insulating layers containing, as their main constituent, the perovskite-type compound represented by the chemical formula "$ABO_3$" are likely to be sintered by the addition of vanadium. It is to be noted that the main constituent $ABO_3$ does not correspond to the stoichiometric composition in some cases. Specifically, the ratio A/B of A to B in terms of mole preferably falls within the range of 0.98 to 1.05.

In the configuration described above, the first insulating layers are arranged inside the second insulating layers, and thus, in the case of firing, the temperatures of the second insulating layers are increased in a relatively quick manner, whereas the temperatures of the first insulating layers are increased in a relatively slow manner. While the quick increase in temperature makes the insulating layers more likely to be sintered, the difference between first and second sintered states can be reduced as much as possible in the case of firing because with the addition of vanadium only to the first insulating layers which have temperatures increased in a relatively slow manner, the addition of vanadium encourages only the first insulating layers to be sintered. As a result, spheroidizing can be suppressed in the internal electrodes placed between the first insulating layers and the second insulating layers, and degradation of the insulation resistance can be suppressed.

Preferably, at least one of the second insulating layers has a principal surface exposed to the outside, on the side opposite to the first insulating layer group.

In this case, the second insulating layer with the principal surface exposed to the outside serves as the outermost layer.

Preferably, (i) Si (silicon) and (ii) at least one of La (lanthanum), Ce (cerium), Pr (praseodymium), Nd (neodymium), Sm (samarium), Eu (europium), Gd (gadolinium), Tb (terbium), Dy (dysprosium), Ho (holmium), Er (erbium), Tm (thulium), Yb (ytterbium), Lu (lutetium), and Y (yttrium) are added to each of the first and second insulating layers.

In this case, adjustments can be made so as to satisfy various types of characteristics (dielectric constant, temperature characteristics of dielectric constant, insulation resistance (IR), lifetime characteristics in a loading test, etc.).

Preferably, the difference in composition between the materials of the first and second insulating layers is only that V (vanadium) is to absent from the material of the second insulating layers, whereas V (vanadium) is present in the material of the first insulating layers.

In this case, it is easy to prepare the materials of the first and second insulating layers.

Preferably, the first and second insulating layers are formed by firing ceramic green sheets including an $ABO_3$ powder. When the specific surface area of the $ABO_3$ powder included in the ceramic green sheets for forming the first insulating layers is denoted by $\beta$, and the specific surface area of the $ABO_3$ powder included in the ceramic green sheets for forming the second insulating layers is denoted by $\alpha$, the relationship between the specific surface areas of the $ABO_3$ powders included in the respective ceramic green sheets for forming the first and second insulating layers is:

$$1.00<\beta/\alpha\leq1.30.$$

When this ratio prevails, the coverage of the internal electrodes placed between the first insulating layers and the second insulating layers is improved, and degradation of the insulation resistance can be further suppressed.

Advantageous Effect of the Invention

According to the present invention, degradation of the insulation resistance due to the addition of vanadium can be suppressed.

MODE FOR CARRYING OUT THE INVENTION

Examples will be described below as embodiments of the present invention.

Example 1

A laminated ceramic capacitor 10 according to Example 1 will be described with reference to FIGS. 1 to 4.

Figure 1:
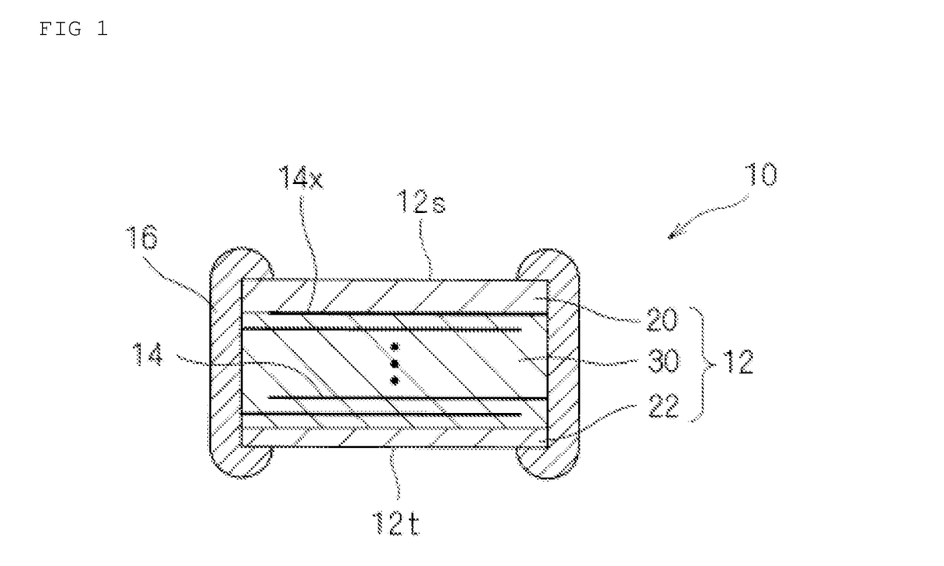
FIG. 1 is a cross-sectional view of a laminated ceramic capacitor. (Example 1)

FIG. 1 is a cross-sectional view of the laminated ceramic capacitor 10. As shown in FIG. 1, the laminated ceramic capacitor 10 has internal electrodes 14 formed inside a main body 12, and external electrodes 16 formed outside the main body 12.

Figure 2:
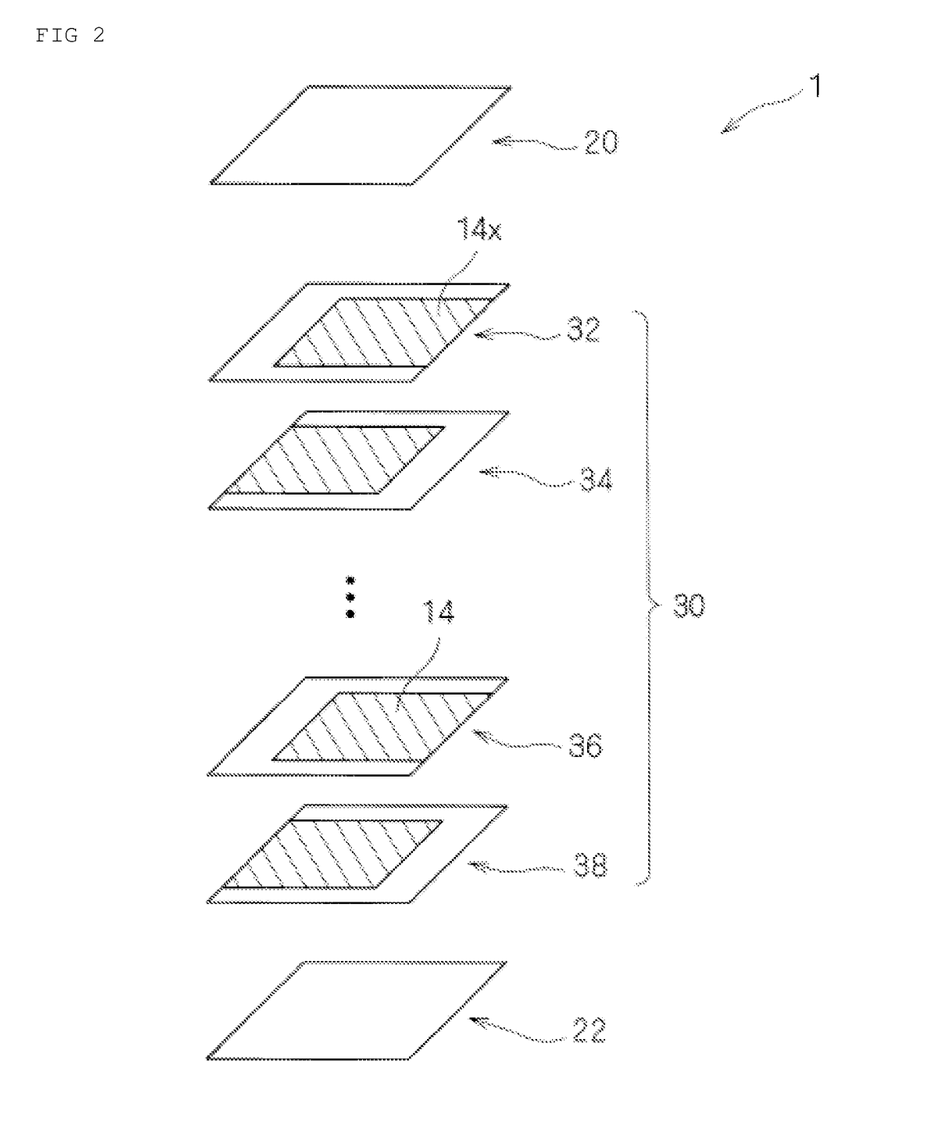
FIG. 2 is an exploded perspective view of a main body of the laminated ceramic capacitor. (Example 1)

FIG. 2 is an exploded perspective view schematically illustrating the configuration of the main body 12. As shown in FIG. 2, the main body 12 has one, or two or more (only one layer shown in FIG. 2) second insulating layers 20, 22 stacked on both sides in the stacking direction of a first insulating layer group 30 including first insulating layers 32, 34, 36, 38 stacked over one another. An upper surface 12s and a lower surface 12t (see FIG. 1) of the main body 12, which are exposed to the outside, are formed by the second insulating layers 20, 22 as the outermost layers.

The internal electrodes 14, which are shaded, are formed on principal surfaces of the first insulating layers 32, 34, 36, 38. In FIG. 2, an internal electrode 14x formed on the principal surface (upper surface) of the first insulating layer 32 as the uppermost layer is placed between the first insulating layer 32 and the second insulating layer 20. The other internal electrodes 14 are placed between the first insulating layers 32, 34, 36, 38.

Figure 3:
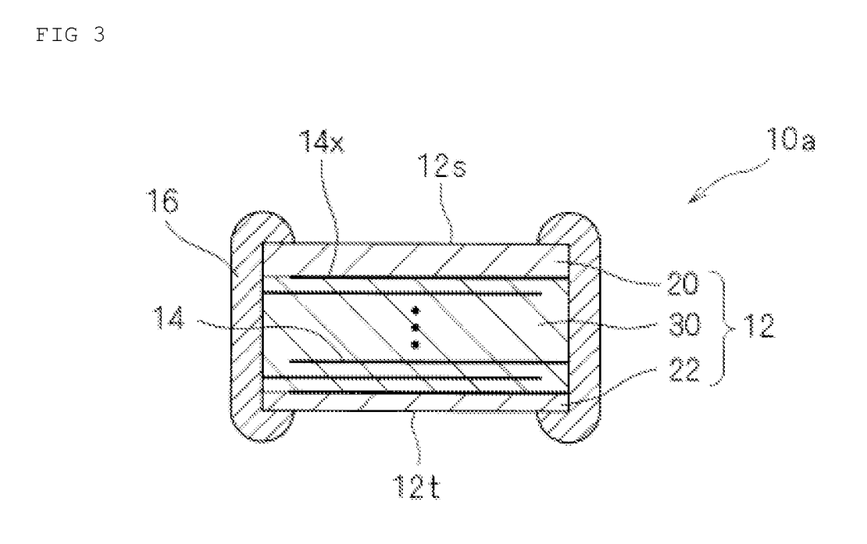
FIG. 3 is a cross-sectional view of a laminated ceramic capacitor. (Modification Example of Example 1)
Figure 4:
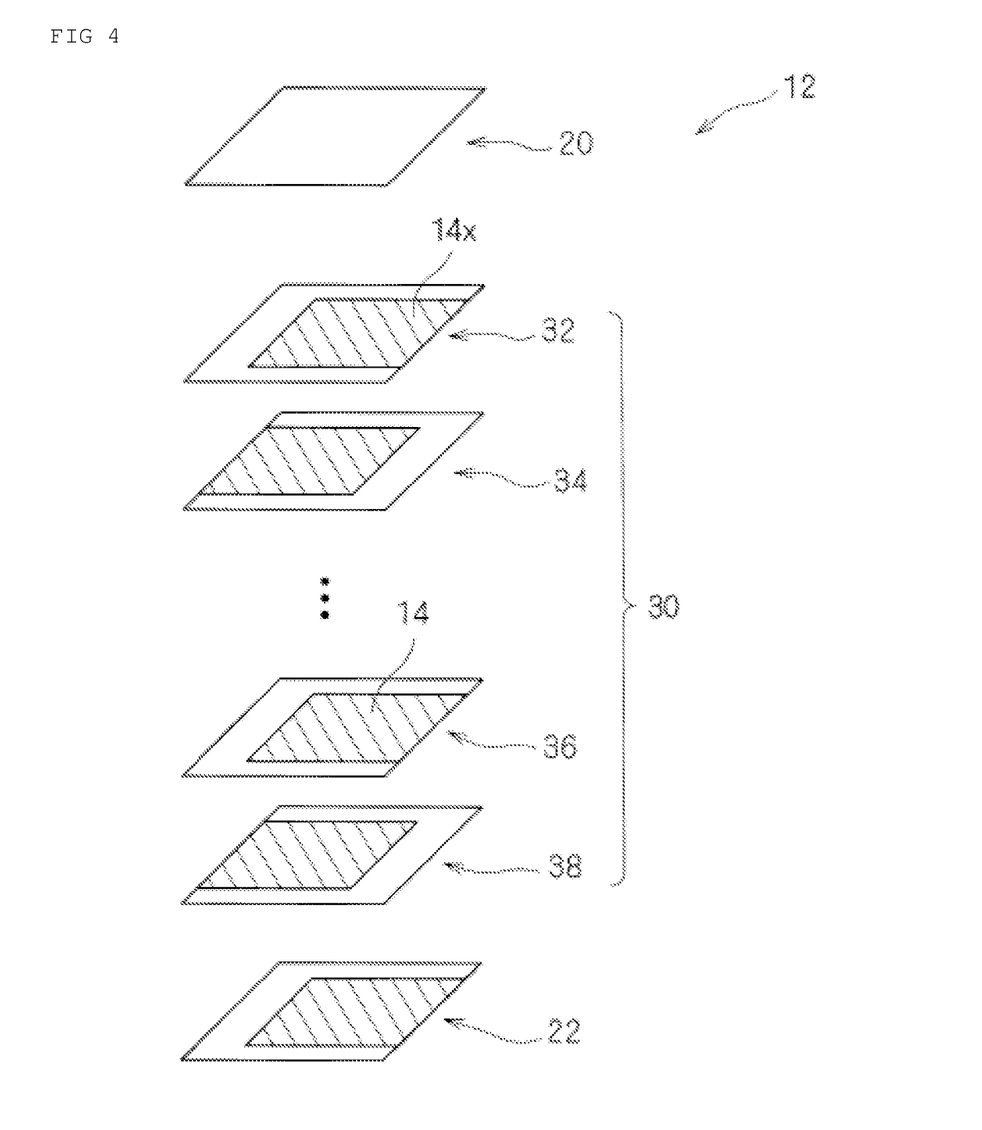
FIG. 4 is an exploded perspective view of a main body of the laminated ceramic capacitor. (Modification Example of Example 1)

As in a modification example laminated ceramic capacitor 10a, which is shown in the cross-sectional view of FIG. 3 and the exploded perspective view of FIG. 4, an internal electrode may be formed on the principal surface (upper surface) of the second insulating layer 22 as the lowermost layer. In this case, the internal electrode formed on the principal surface (upper surface) of the second insulating layer 22 as the lowermost layer is placed between the first insulating layer 38 and the second insulating layer 22.

The first and second insulating layers 32, 34, 36, 38 and 20, 22 are dielectric ceramic layers, which contain, as their main constituent, a perovskite-type compound such as barium titanate ($BaTiO_3$).

The perovskite-type compound is represented by the chemical formula "$ABO_3$" wherein "A" denotes at least one of Ba, Sr, and Ca, "B" denotes at least one of Ti, Zr, and Hf, and "O" denotes oxygen.

Vanadium is added to only the first insulating layers 32, 34, 36, 38. Therefore, the first insulating layers 32, 34, 36, 38 differ in composition from the second insulating layers 20, 22. The addition of vanadium makes the first insulating layers 32, 34, 36, 38 more likely to be sintered in the case of firing.

The first insulating layers 32, 34, 36, 38 are arranged inside the second insulating layers 20, 22, and thus, in the case of firing, the temperatures of the second insulating layers 20, 22 are increased in a relatively quick manner, whereas the temperatures of the first insulating layers 32, 34, 36, 38 are increased in a relatively slow manner. While the quick increase in temperature makes the insulating layers more likely to be sintered, and the addition of vanadium only to the first insulating layers 32, 34, 36, 38 which have temperatures increased in a relatively slow manner, the addition of vanadium encourages only the first insulating layers 32, 34, 36, 38 to be sintered. Thus, the difference in sintered state (the degree of sintering developed) between the first and second insulating layers 32, 34, 36, 38 and 20, 22 can be reduced as much as possible in the case of firing. As a result, spheroidizing can be suppressed in the internal electrode 14x placed between the first insulating layer 32 and the second insulating layer 20, and degradation of the insulation resistance can be suppressed.

Various accessory constituents such as Mg, Mn, Si, and rare-earth elements may be added to the first and second insulating layers 32, 34, 36, 38 and 20, 22. The addition of the accessory constituents can enable adjustments in various types of characteristics (dielectric constant, temperature characteristics of dielectric constant, insulation resistance (IR), lifetime characteristics in a loading test, etc.).

For example, (i) Si and (ii) at least one of La, Ce, Pr, Nd, Sm, Eu, Gd, Tb, Dy, Ho, Er, Tm, Yb, Lu, and Y are added to each of the first and second insulating layers 32, 34, 36, 38 and 20, 22.

Next, a specific preparation example will be described.

A) Preparation of Formulation of Dielectric Raw Materials

Materials are prepared for preparing a main body of a laminated ceramic capacitor. In this case, the material for forming the second insulating layers is referred to as an $\alpha$ material, whereas the material for forming the first insulating layers is referred to as a $\beta$ material.

The main constituent of the $\alpha$ material is a perovskite-type compound represented by $ABO_3$. In this case, "A" stands can contain one or more of Sr and Ca in addition to Ba, "B" can contain one or more of Zr and Hf in addition to Ti, and "O" stands for oxygen.

The $\alpha$ material contains, as additive constituents, at least (a) Si and (b) R ("R" is at least one of La, Ce, Pr, Nd, Sm, Eu, Gd, Tb, Dy, Ho, Er, Tm, Yb, Lu and Y). The $\alpha$ material may contain M ("M" is at least one of Mn, Ni, Co, Fe, Cr, Cu, Mg, Al, Mo, W). The $\alpha$ material is a dielectric ceramic.

The β material is a dielectric ceramic of the α material with V (vanadium) added thereto as an additive constituent.

The materials were prepared in accordance with the following procedures.

First, respective powders of $BaCO_3$, $SrCO_3$, $CaCO_3$, $TiO_2$, $ZrO_2$, and $HfO_2$ were prepared as starting raw materials, weighed for the respective content rates of Ba, Sr, and Ca in terms of parts by mole with respect to the total content of Ba, Sr, and Ca as shown below in Table 1a and Table 1b, the respective content rates of Ti, Zr, and Hf in terms of parts by mole with respect to the total content of Ti, Zr, and Hf as shown in Table 1a and Table 1b, and further the total content m of Ba, Sr, and Ca in terms of parts by mole with respect to the total content, 1 part by mole, of Ti, Zr, and Hf, then mixed in a ball mill, and subjected to a heat treatment at 1150° C. to obtain a main constituent powder. This main constituent powder was 0.15 μm in average particle size. Tables 1a and 1b show the values of m in respective examples.

In addition to the main constituent powder, Si, R, M, and V were weighed for the additive amounts of Si, R, M, and V in parts by mole with respect to the total content, 100 parts by mole, of Ti, Zr, and Hf as shown in Table 1a and Table 1b below, and mixed and dried in a ball mill to provide a formulation of the dielectric raw materials. While Si as an $SiO_2$ powder, V as a $V_2O_5$ powder, and R and M as oxide powders were added herein, similar effects are produced even in forms such as carbonate compounds and organic metals.

Further, it has been confirmed by an ICP emission spectrometric analysis that the obtained formulations of the dielectric raw materials are nearly identical to the prepared compositions shown in Table 1a and Table 1b.

It is to be noted that while the main constituent powders were prepared by a solid-phase synthesis method, and subjected to a heat treatment at a temperature for achieving desired grain sizes, a hydrothermal synthesis method, a hydrolysis method, etc. may be used to prepare the main constituent powders. In addition, the materials for the preparation of the main constituent powders and the compound forms of the additive constituents are not limited to oxides and carbonates, and chlorides, metal organic compounds, etc. may be selected appropriately. In addition, the main constituent $ABO_2$ does not correspond to the stoichiometric composition in some cases. Specifically, the ratio A/B of A to B in terms of mole preferably falls within the range of 0.98 to 1.05.

B) Preparation of Laminated Ceramic Capacitor

A laminated ceramic capacitor was prepared in accordance with the following procedure.

The formulation was subjected to wet mixing in a ball mill with the addition of a polyvinyl butyral-based binder and an organic solvent such as ethanol, thereby preparing a ceramic slurry. In this case, the ceramic slurry with no V added is referred to as the α material, whereas the ceramic slurry with V added thereto is referred to as the β material. V is added in the amount shown in Table 1b to the α material according to Comparative Example 1-2 described later. The ceramic particles included in the ceramic slurry of the α material and the ceramic slurry of the β material were adjusted to the same value for the specific surface area. The ceramic slurries were was subjected to sheet forming by a doctor blade method so that the fired dielectric element was 3.0 μm in thickness, thereby providing rectangular green sheets.

Next, a conductive paste containing Ni as its main constituent was applied by screen printing onto the ceramic green sheets of β material to form conductive paste layers for constituting internal electrodes.

A laminated body was obtained by stacking a plurality of ceramic green sheets of α material, then stacking the plurality of ceramic green sheets of β material with the conductive paste layers formed thereon so as to alternate the sides to which the conductive paste was extracted, and then stacking a plurality of ceramic green sheets of α material.

This laminated body with the binder burned in a $N_2$ atmosphere was then subjected to firing at 1200° C. in a reducing atmosphere composed of a $H_2$—$N_2$—$H_2O$ gas with an oxygen partial pressure of $10^{-10}$ MPa to obtain a sintered ceramic laminated body.

A Cu paste containing $B_2O_3$—$Li_2O$—$SiO_2$—$BaO$ glass frit was applied onto both end surfaces of the sintered ceramic laminated body obtained after the firing, and baked at a temperature of 800° C. in a $N_2$ atmosphere to form external electrodes electrically connected to the internal electrodes.

The laminated capacitor obtained as described above had external dimensions of width: 1.25 mm, length: 2.0 mm, and thickness: 1.0 mm, and the dielectric ceramic layer (first insulating layer) interposed between the internal electrodes was 3.0 μm in thickness. In addition, the total number of effective dielectric ceramic layers was 10, and the area of the electrode opposed per layer was 1.6 $mm^2$.

Cu electrodes were applied by baking onto end surfaces of the sintered body obtained, thereby providing a measurement sample (laminated ceramic capacitor).

The measurement sample obtained in the way described above was subjected to electrolytic stripping with the use of electrolysis to strip off the Ni internal electrode along the Ni electrode section in the outermost layer section and the Ni electrode section near the center of the ceramic laminated body, and the coverage of the Ni internal electrode was measured by image analysis. The number of measurement samples was 10, among which the average value for the coverage was obtained.

The obtained measurement sample was cut in the stacking direction at a ½ position in the L direction (length direction) to expose a vertical section (WT cross section) of the ceramic laminated body.

This exposed cross section was subjected to composition analysis for the inner layer section of the first insulating layers and the outer layer section of the second insulating layers through ICP analysis with the use of a laser ablation method to confirm that the compositions were nearly identical to the prepared compositions shown in Table 1a and Table 1b.

Table 1a and Table 1b below show the material composition, firing temperature, coverage, and difference in coverage, for the insulating layers according to respective examples and comparative examples.

TABLE 1a

| | Ba/(Ba + Sr + Ca) | Sr/(Ba + Sr + Ca) | Ca/(Ba + Sr + Ca) | Ti/(Ti + Zr + Hf) | Zr/(Ti + Zr + Hf) | Hf/(Ti + Zr + Hf) | m |
|---|---|---|---|---|---|---|---|
| Comparative Example 1-1 | 1 | 0 | 0 | 1 | 0 | 0 | 1.0070 |
| Comparative Example 1-2 | 1 | 0 | 0 | 1 | 0 | 0 | 1.0070 |

TABLE 1a-continued

| | Ba/(Ba + Sr + Ca) | Sr/(Ba + Sr + Ca) | Ca/(Ba + Sr + Ca) | Ti/(Ti + Zr + Hf) | Zr/(Ti + Zr + Hf) | Hf/(Ti + Zr + Hf) | m |
|---|---|---|---|---|---|---|---|
| Example 1-1 | 1 | 0 | 0 | 1 | 0 | 0 | 1.0070 |
| Example 1-2 | 1 | 0 | 0 | 1 | 0 | 0 | 1.0070 |
| Example 1-3 | 0.95 | 0 | 0.05 | 0.99 | 0.01 | 0 | 1.0070 |
| Example 1-4 | 0.8 | 0 | 0.2 | 0.99 | 0.01 | 0 | 1.0070 |
| Example 1-5 | 0.99 | 0 | 0.01 | 0.99 | 0.01 | 0 | 1.0070 |
| Example 1-6 | 0.96 | 0 | 0.04 | 0.99 | 0.01 | 0 | 1.0070 |
| Example 1-7 | 0.95 | 0 | 0.05 | 0.99 | 0 | 0.01 | 1.0070 |
| Example 1-8 | 0.9 | 0.1 | 0 | 0.98 | 0.02 | 0 | 1.0070 |
| Example 1-9 | 0.9 | 0.05 | 0.05 | 0.98 | 0.01 | 0.01 | 1.0070 |
| Example 1-10 | 1 | 0 | 0 | 1 | 0 | 0 | 1.0070 |
| Example 1-11 | 1 | 0 | 0 | 1 | 0 | 0 | 1.0070 |
| Example 1-12 | 1 | 0 | 0 | 1 | 0 | 0 | 1.0070 |
| Example 1-13 | 1 | 0 | 0 | 1 | 0 | 0 | 1.0070 |
| Example 1-14 | 1 | 0 | 0 | 1 | 0 | 0 | 1.0070 |
| Example 1-15 | 0.8 | 0 | 0.2 | 1 | 0 | 0 | 1.0070 |
| Example 1-16 | 0.8 | 0 | 0.2 | 1 | 0 | 0 | 1.0070 |
| Example 1-17 | 0.8 | 0 | 0.2 | 1 | 0 | 0 | 1.0070 |
| Example 1-18 | 0.8 | 0 | 0.2 | 1 | 0 | 0 | 1.0070 |
| Example 1-19 | 0.8 | 0 | 0.2 | 1 | 0 | 0 | 1.0070 |
| Example 1-20 | 0.8 | 0 | 0.2 | 1 | 0 | 0 | 1.0070 |
| Example 1-21 | 0.8 | 0 | 0.2 | 1 | 0 | 0 | 1.0070 |
| Example 1-22 | 0.8 | 0 | 0.2 | 1 | 0 | 0 | 1.0070 |
| Example 1-23 | 0.99 | 0 | 0.01 | 0.99 | 0.01 | 0 | 1.0070 |
| Example 1-24 | 0.99 | 0 | 0.01 | 0.99 | 0.01 | 0 | 1.0070 |
| Example 1-25 | 0.99 | 0 | 0.01 | 0.99 | 0.01 | 0 | 1.0070 |
| Example 1-26 | 0.99 | 0 | 0.01 | 0.99 | 0.01 | 0 | 1.0070 |
| Example 1-27 | 0.99 | 0 | 0.01 | 0.99 | 0.01 | 0 | 1.0070 |
| Example 1-28 | 0.99 | 0 | 0.01 | 0.99 | 0.01 | 0 | 1.0070 |

TABLE 1b

| | Si Content (parts by mol) | R | Content (parts by mol) | M | Content (parts by mol) | V Content in Inner Layer Section (parts by mol) | V Content in Outer Layer Section (parts by mol) | Firing Temperature (° C.) | Electrode Coverage of Inner Layer Section (%) | Electrode Coverage of Outermost Layer (%) | Difference in Coverage |
|---|---|---|---|---|---|---|---|---|---|---|---|
| Comparative Example 1-1 | — | — | — | — | — | 0 | 0 | 1300 | 79 | 60 | 19 |
| Conparative Example 1-2 | — | — | — | — | — | 0.17 | 0.17 | 1300 | 81 | 65 | 16 |
| Example 1-1 | — | — | — | — | — | 0.12 | 0 | 1300 | 87 | 81 | 6 |
| Example 1-2 | — | — | — | — | — | 0.12 | 0.01 | 1300 | 83 | 73 | 10 |
| Example 1-3 | — | — | — | — | — | 0.02 | 0 | 1240 | 65 | 59 | 6 |
| Example 1-4 | — | — | — | — | — | 0.20 | 0 | 1240 | 69 | 63 | 6 |
| Example 1-5 | — | — | — | — | — | 0.02 | 0 | 1200 | 80 | 71 | 9 |
| Example 1-6 | — | — | — | — | — | 0.08 | 0 | 1200 | 81 | 73 | 8 |
| Example 1-7 | — | — | — | — | — | 0.21 | 0 | 1320 | 89 | 81 | 8 |
| Example 1-8 | — | — | — | — | — | 0.04 | 0 | 1280 | 90 | 80 | 10 |
| Example 1-9 | — | — | — | — | — | 0.07 | 0 | 1310 | 80 | 71 | 9 |
| Example 1-10 | 3.0 | — | — | — | — | 0.14 | 0 | 1260 | 63 | 53 | 10 |
| Example 1-11 | 1.1 | Eu | 1.2 | Mn | 1.0 | 0.08 | 0 | 1280 | 79 | 70 | 9 |
| Example 1-12 | — | Gd | 0.3 | Mo | 0.8 | 0.18 | 0 | 1220 | 83 | 76 | 7 |
| Example 1-13 | 1.0 | Er | 3.0 | Ni | 0.2 | 0.08 | 0 | 1250 | 81 | 72 | 9 |
| Example 1-14 | 1.2 | Y | 1.7 | Cr | 1.5 | 0.19 | 0 | 1240 | 86 | 78 | 8 |
| Example 1-15 | 1.1 | — | — | Fe | 0.7 | 0.06 | 0 | 1320 | 64 | 55 | 9 |

TABLE 1b-continued

|  | Si Content (parts by mol) | R Content (parts by mol) | M Content (parts by mol) |  | V Content in Inner Layer Section (parts by mol) | V Content in Outer Layer Section (parts by mol) | Firing Temperature (° C.) | Electrode Coverage of Inner Layer Section (%) | Electrode Coverage of Outermost Layer (%) | Difference in Coverage |
|---|---|---|---|---|---|---|---|---|---|---|
| Example 1-16 | 1.3 | Sm | 1.0 | Co | 2.6 | 0.07 | 0 | 1320 | 85 | 75 | 10 |
| Example 1-17 | 3.1 | Y | 1.0 | Al | 1.1 | 0.19 | 0 | 1200 | 67 | 59 | 8 |
| Example 1-18 | 0.5 | Lu, Dy | 2.0, 2.1 | Mg | 0.5 | 0.03 | 0 | 1250 | 67 | 61 | 6 |
| Example 1-19 | 1.5 | Sm | 1.2 | Mn | 1.7 | 0.04 | 0 | 1210 | 74 | 66 | 8 |
| Example 1-20 | 1.6 | Er | 3.0 | Fe | 1.8 | 0.24 | 0 | 1260 | 76 | 70 | 6 |
| Example 1-21 | 1.1 | Pr | 0.4 | Al | 0.1 | 0.18 | 0 | 1240 | 63 | 57 | 6 |
| Example 1-22 | 1.8 | La, Dy | 1.2, 0.5 | W, Mn | 0.5, 0.5 | 0.12 | 0 | 1290 | 87 | 78 | 9 |
| Example 1-23 | — | Ce | 1.5 | Mo | 1.3 | 0.05 | 0 | 1210 | 66 | 57 | 9 |
| Example 1-24 | 0.1 | Tb | 2.5 | Co | 0.2 | 0.19 | 0 | 1240 | 63 | 56 | 7 |
| Example 1-25 | 1.2 | Tm | 4.0 | W | 0.3 | 0.04 | 0 | 1290 | 67 | 60 | 7 |
| Example 1-26 | 3.8 | — | — | Mg | 3.5 | 0.05 | 0 | 1260 | 68 | 62 | 6 |
| Example 1-27 | 1.7 | Tb | 3.1 | W | 0.2 | 0.18 | 0 | 1290 | 81 | 74 | 7 |
| Example 1-28 | 0.8 | Ho | 0.1 | Ni | 2.3 | 0.08 | 0 | 1270 | 77 | 69 | 8 |

It is to be noted that in the table, the "Inner Layer Section" refers to the first insulating layers, whereas the "Outer Layer Section" refers to the second insulating layers.

In Examples 1-1 to Example 1-28 shown in Table 1a and Table 1b, V is added to the inner layer section (first insulating layers), whereas V is not added to the outer layer section (second insulating layers). It is to be noted that Example 1-2 has 0.01 parts by mole or less of V in the outer layer section, which is accordingly considered to have "no V added".

In Examples 1-1 to Examples 1-28, the difference in Ni internal electrode cover area falls within 10% between the inner layer section (first insulating layers) and the outer layer section (second insulating layers). Thus, it is determined that insulation degradation can be suppressed for the internal electrode (the internal electrode denoted by reference numeral 14x in FIG. 1) of the outer layer section. In addition, Example 1-1 with the V content of 0 parts by mole in the outer layer section in Table 1a and Table 1b succeeded in achieving a more favorable difference in coverage, as compared with Example 1-2 with the V content of 0.01 parts by mole in the outer layer section therein.

In Comparative Example 1-1 shown in Table 1a and Table 1b, V is not added to either the inner layer section (first insulating layers) or the outer layer section (second insulating layers). In Comparative Example 1-2, V is added to both the inner layer section (first insulating layers) and the outer layer section (second insulating layers). In any of these cases, the difference in Ni internal electrode cover area is 10% or more between the inner layer section and the outer layer section. This is because the excessively large difference in the degree of sintering developed between the inner layer section (first insulating layers) and the outer layer section (second insulating layers) causes the internal electrodes to be spherically shaped in the process of sintering.

Example 2

A laminated ceramic capacitor according to Example 2 will be described.

The laminated ceramic capacitor according to Example 2 has substantially the same configuration as in Example 1, but differs from Example 1 in that the specific surface area of the material (β material) of the first insulating layers has a different value from the specific surface area of the material (α material) of the second insulating layers.

A specific preparation example will be described below.

First, formulations of dielectric raw materials were obtained in the same way as in Example 1. Table 2 shows prepared compositions according to respective examples.

Further, it has been confirmed by an ICP emission spectrometric analysis that the obtained formulations of the dielectric raw materials are nearly identical to the prepared compositions shown in Table 2.

Next, as in the production process described in Example 1, the conditions for preparing a ceramic slurry were adjusted to control the grinding for ceramic particles and the grinding state, and ceramic sheets of an α material with an appropriate specific surface area were prepared to obtain a measurement sample (laminated ceramic capacitor) designed in the same fashion as in Example 1. In this case, when the specific surface area of the α material is denoted by a, whereas the specific surface area of the β material is denoted by β, the relationship between the both materials is:

$$1.00 < \beta/\alpha \leq 1.30 \quad (1).$$

The composition analysis for the inner layer section of the first insulating layers and the outer layer section of the second insulating layers was carried out through ICP analysis with the use of a laser ablation method in the same way as in Example 1 to confirm that the compositions were nearly identical to the prepared compositions shown in Table 2.

The specific surface area of the ceramic was measured by the single point BET method as a flow method. In addition, the ceramic grain size after the sintering for the laminated ceramic capacitor is correlated with the specific surface area after the sheet preparation.

Table 2 below shows, for the insulating layers according to the respective examples, the material composition, the specific surface area ratio between the α material and the β material, the firing temperature, the coverage obtained in the same way as in Example 1, and the difference in coverage. In the table below, the "Inner Layer Section" refers to the first insulating layers, whereas the "Outer Layer Section" refers to the second insulating layers.

TABLE 2

| | Ba/(Ba + Sr + Ca) | Sr/(Ba + Sr + Ca) | Ca/(Ba + Sr + Ca) | Ti/(Ti + Zr + Hf) | Zr/(Ti + Zr + Hf) | Hf/(Ti + Zr + Hf) | m | Si Content (parts by mol) |
|---|---|---|---|---|---|---|---|---|
| Example 2-1 | 1 | 0 | 0 | 1 | 0 | 0 | 1.0070 | 1.1 |
| Example 2-2 | 1 | 0 | 0 | 1 | 0 | 0 | 1.0070 | 1.1 |
| Example 2-3 | 1 | 0 | 0 | 1 | 0 | 0 | 1.0070 | 1.1 |
| Example 2-4 | 1 | 0 | 0 | 1 | 0 | 0 | 1.0070 | 1.1 |
| Example 2-5 | 0.8 | 0 | 0.2 | 1 | 0 | 0 | 1.0070 | 1.5 |
| Example 2-6 | 0.8 | 0 | 0.2 | 1 | 0 | 0 | 1.0070 | 1.5 |
| Example 2-7 | 0.8 | 0 | 0.2 | 1 | 0 | 0 | 1.0070 | 1.5 |
| Example 2-8 | 0.8 | 0 | 0.2 | 1 | 0 | 0 | 1.0070 | 1.5 |

| | R Content (parts by mol) | M Content (parts by mol) | V Content in Inner Layer Section (parts by mol) | V Content in Outer Layer Section (parts by mol) | Specific Surface Area Ratio of Inner Layer to Outer Layer for Unfired Ceramic Particles [Inner Layer Specific Surface Area/Outer Layer Specific Surface Area] | Firing Temperature (°C.) | Electrode Coverage of Inner Layer Section (%) | Electrode Coverage of Outermost Layer (%) | Difference in Coverage (%) |
|---|---|---|---|---|---|---|---|---|---|
| Example 2-1 | Eu 1.2 | Mn 1.0 | 0.08 | 0 | 1.05 | 1280 | 79 | 72 | 7 |
| Example 2-2 | Eu 1.2 | Mn 1.0 | 0.08 | 0 | 1.12 | 1280 | 79 | 76 | 3 |
| Example 2-3 | Eu 1.2 | Mn 1.0 | 0.08 | 0 | 1.21 | 1280 | 79 | 73 | 6 |
| Example 2-4 | Eu 1.2 | Mn 1.0 | 0.08 | 0 | 1.30 | 1280 | 79 | 71 | 8 |
| Example 2-5 | Sm 1.2 | Mn 1.7 | 0.04 | 0 | 1.02 | 1210 | 74 | 68 | 6 |
| Example 2-6 | Sm 1.2 | Mn 1.7 | 0.04 | 0 | 1.17 | 1210 | 74 | 70 | 4 |
| Example 2-7 | Sm 1.2 | Mn 1.7 | 0.04 | 0 | 1.22 | 1210 | 74 | 71 | 3 |
| Example 2-8 | Sm 1.2 | Mn 1.7 | 0.04 | 0 | 1.27 | 1210 | 74 | 68 | 6 |

In Example 2-1 to Example 2-8, the specific surface area ratio satisfies the relational expression of formula (1). In comparison with Example 1 shown in Table 1a and Table 1b, it is determined that the effect on the difference in Ni internal electrode cover area between the inner layer section (first insulating layers) and the outer layer section (second insulating layers) is increased more than in Example 1 to improve the Ni internal electrode coverage of the outer layer section (second insulating layers).

CONCLUSION

As described above, the addition of V only to the first insulating layers can suppress degradation of the insulation resistance due to the addition of vanadium.

It is to be noted that the present invention is not to be considered limited to the embodiments, and various modifications can be made in the practice of the invention.

DESCRIPTION OF REFERENCE SYMBOLS

10, 10a laminated ceramic capacitor
12 main body
14 internal electrode
16 external electrode
20, 22 second insulating layer
30 first insulating layer group
32, 34, 36, 38 first insulating layer

The invention claimed is:
1. A laminated ceramic capacitor comprising:
   a plurality of first insulating layers stacked over one another;
   a first internal electrode disposed on a principal surface of a first insulating layer of the plurality of insulating layers;
   a pair of second insulating layers stacked respectively on opposed sides in a stacking direction of the plurality of first insulating layers, and
   a second internal electrode disposed between and in direct contact with both a surface of the plurality of first insulating layers on which the first internal electrode is not present and a second insulating layer of at least one of the pair of second insulating layers,
   wherein the plurality of first insulating layers and the plurality of second insulating layers comprise, as their main constituent, a perovskite compound represented by a chemical formula "$ABO_3$" wherein "A" denotes at least one of Ba, Sr, and Ca, "B" denotes at least one of Ti, Zr, and Hf, and "O" denotes oxygen, only the plurality of first insulating layers further contain V, and the first internal electrode and the second internal electrode are not present inside the pair of the second insulating layers, and all insulating layers are either the plurality of first insulating layers or the plurality of second insulating layers.

2. The ceramic capacitor according to claim 1, wherein at least one of the second insulating layers has a first principal surface which is not opposite a first insulating layer of the plurality of first insulating layers and a second principal surface opposite to a first insulating layer of the plurality of first insulating layers.

3. The laminated ceramic capacitor according to claim 2, wherein Si, and at least one member selected from the group consisting of La, Ce, Pr, Nd, Sm, Eu, Gd, Tb, Dy, Ho, Er, Tm, Yb, Lu, and Y are present in each of the plurality of first insulating layers and the plurality of second insulating layers.

4. The laminated ceramic capacitor according to claim 3, wherein the only difference in the composition of the materials of the plurality of first insulating layers and the plurality of second insulating layers is the presence of V.

5. The laminated ceramic capacitor according to claim 4,
wherein the plurality of first insulating layers and the plurality of second insulating layers are formed by firing ceramic green sheets comprising an $ABO_3$ powder, and when the specific surface area of the $ABO_3$ powder of the ceramic green sheets of the first insulating layers is denoted by $\beta$, and the specific surface area of the $ABO_3$ powder of the ceramic green sheets of the second insulating layers is denoted by $\alpha$, the relationship between the specific surface areas of the $ABO_3$ powders is $1.00 < \beta/\alpha \le 1.30$.

6. The laminated ceramic capacitor according to claim 5, wherein the molar amount of V, Si and the member(s) of said group consisting of La, Ce, Pr, Nd, Sm, Eu, Gd, Tb, Dy, Ho, Er, Tm, Yb, Lu, and Y per 100 mols of B are 0.02 to 0.24, 1.1 to 3.8, and 0.3 to 2, respectively.

7. The laminated ceramic capacitor according to claim 6, wherein A comprises Ba and B comprises Ti.

8. The laminated ceramic capacitor according to claim 1, wherein Si, and at least one member selected from the group consisting of La, Ce, Pr, Nd, Sm, Eu, Gd, Tb, Dy, Ho, Er, Tm, Yb, Lu, and Y are present in each of the plurality of first insulating layers and the plurality of second insulating layers.

9. The laminated ceramic capacitor according to claim 8, wherein the only difference in composition of the materials of the plurality of first insulating layers and the plurality of second insulating layers is the presence of V.

10. The laminated ceramic capacitor according to claim 9,
wherein the plurality of first insulating layers and the plurality of second insulating layers are formed by firing ceramic green sheets comprising an $ABO_3$ powder, and when the specific surface area of the $ABO_3$ powder of the ceramic green sheets of the first insulating layers is denoted by $\beta$, and the specific surface area of the $ABO_3$ powder of the ceramic green sheets of the second insulating layers is denoted by $\alpha$, the relationship between the specific surface areas of the $ABO_3$ powder is $1.00 < \beta/\alpha \le 1.30$.

11. The laminated ceramic capacitor according to claim 10, wherein the molar amount of V, Si and the member(s) of said group consisting of La, Ce, Pr, Nd, Sm, Eu, Gd, Tb, Dy, Ho, Er, Tm, Yb, Lu, and Y per 100 mols of B are 0.02 to 0.24, 1.1 to 3.8, and 0.3 to 2, respectively.

12. The laminated ceramic capacitor according to claim 11 wherein A comprises Ba and B comprises Ti.

13. The laminated ceramic capacitor according to claim 11,
wherein the first and second insulating layers are formed by firing ceramic green sheets comprising an $ABO_3$ powder, and when the specific surface area of the $ABO_3$ powder of the ceramic green sheets of the first insulating layers is denoted by $\beta$, and the specific surface area of the $ABO_3$ powder of the ceramic green sheets of the second insulating layers is denoted by $\alpha$, the relationship between the specific surface areas of the $ABO_3$ powder is $1.00 < \beta/\alpha \le 1.30$.

14. The laminated ceramic capacitor according to claim 13, wherein A comprises Ba and B comprises Ti.

15. The laminated ceramic capacitor according to claim 13, wherein the molar amount of V per 100 mols of B is 0.02 to 0.24.

16. The laminated ceramic capacitor according to claim 1, wherein the molar amount of V per 100 mols of B is 0.02 to 0.2.

17. A laminated ceramic capacitor comprising:

a plurality of first insulating layers stacked over one another;

a first internal electrode disposed on a principal surface of a first insulating layer;

a pair of second insulating layers stacked respectively on both sides in a stacking direction of a group of first insulating layers which includes the first internal electrode, and a second internal electrode disposed on a surface of a first insulating layer on which the first internal electrode is not present and disposed between a first insulating layer and a second insulating layer, wherein the first and second insulating layers comprise, as their main constituent, a perovskite compound represented by a chemical formula "$ABO_3$" wherein "A" denotes at least one of Ba, Sr, and Ca, "B" denotes at least one of Ti, Zr, and Hf, and "O" denotes oxygen, only the first insulating layers further contains V, the first internal electrode and the second internal electrode are not present inside the pair of the second insulating layers, all insulating layers are either the first insulating layers or the second insulating layers, wherein the only difference in composition of the materials of the first and second insulating layers is the presence of V.

18. A laminated ceramic capacitor comprising:

a plurality of first insulating layers stacked over one another;

a first internal electrode disposed on a principal surface of a first insulating layer;

a pair of second insulating layers stacked respectively on both sides in a stacking direction of a group of first insulating layers which includes the first internal electrode, and a second internal electrode disposed on a surface of a first insulating layer on which the first internal electrode is not present and disposed between a first insulating layer and a second insulating layer, wherein the first and second insulating layers comprise, as their main constituent, a perovskite compound represented by a chemical formula "$ABO_3$," wherein "A" denotes at least one of Ba, Sr, and Ca, "B" denotes at least one of Ti, Zr, and Hf, and "O" denotes oxygen, only the first insulating layers further contains V, the first internal electrode and the second internal electrode are not present inside the pair of the second insulating layers, all insulating layers are either the first insulating layers or the second insulating layers, wherein the first and second insulating layers are formed by firing ceramic green sheets comprising an $ABO_3$ powder, and when the specific surface area of the $ABO_3$ powder of the ceramic green sheets of the first insulating layers is denoted by $\beta$, and the specific surface area of the $ABO_3$ powder of the ceramic green sheets of the second insulating layers is denoted by $\alpha$, the relationship between the specific surface areas of the $ABO_3$ powder is $1.00 < \beta/\alpha \leq 1.30$.

19. The laminated ceramic capacitor according to claim 18 wherein the molar amount of V per 100 mols of B is 0.02 to 0.24.

20. The laminated ceramic capacitor according to claim 19, wherein A comprises Ba and B comprises Ti.

* * * * *